United States Patent [19]

Prosise et al.

[11] Patent Number: 4,865,863

[45] Date of Patent: Sep. 12, 1989

[54] CO-MILLING FIBER FOR USE IN FOODS

[75] Inventors: Robert L. Prosise; David A. Volker, both of Cincinnati, Ohio

[73] Assignee: The Procter & Gamble Company, Cincinnati, Ohio

[21] Appl. No.: 112,014

[22] Filed: Oct. 20, 1987

Related U.S. Application Data

[63] Continuation of Ser. No. 815,420, Dec. 31, 1985, abandoned.

[51] Int. Cl.$^4$ .............................................. A23P 1/00
[52] U.S. Cl. ................................... 426/518; 426/555; 426/804
[58] Field of Search ............... 426/478, 554, 555, 518, 426/804, 589; 241/101 D; 162/9

[56] References Cited

U.S. PATENT DOCUMENTS

| | | | |
|---|---|---|---|
| 3,694,230 | 9/1972 | Cooke | 426/555 |
| 4,374,702 | 2/1983 | Turbak et al. | 162/9 |
| 4,378,381 | 3/1983 | Turbak et al. | 426/589 |
| 4,481,077 | 11/1984 | Herrick | 162/9 |
| 4,503,083 | 3/1985 | Glicksman et al. | 426/555 |

*Primary Examiner*—George Yeung
*Attorney, Agent, or Firm*—Gary M. Sutter; Ronald L. Hemingway; Richard C. Witte

[57] ABSTRACT

This invention is a process for rendering an edible fiber more easily hydratable for addition to food products. Edible fiber is co-milled in a multi-impact mill with sugar and optionally flour and starch. This co-milling improves the dispersion and the water absorbing rate of the fiber when it is added to food. The addition of fiber allows more water to be held, resulting in better and moister tasting food products. The invention also comprises the fiber product made according of this process.

18 Claims, No Drawings

CO-MILLING FIBER FOR USE IN FOODS

This is a continuation of application Serial No. 815,420, filed on Dec. 31, 1985, now abandoned.

TECHNICAL FIELD

The health benefits of an adequate amount of fiber in the diet have recently become more widely recognized. Dietary fiber is thought to be important in reducing the risk of certain types of cancer, and in the control of blood cholesterol levels. Low calorie foods can also be made with fiber to help reduce obesity.

Fiber can also be used to hold water or other liquids in foods to improve taste.

Previous methods of adding fiber to foods such as dry mixes have generally involved three procedures: prehydrating the fiber with water before adding it to the food, mixing the fiber with oil before its addition, or simply adding dry fiber to the food. The first two methods are inconvenient, and often do not prepare the fiber well for addition to the food. Simply mixing dry fiber with food can result in inadequate mixing.

It is therefore an object of this invention to provide a method of incorporating edible fiber into food which is convenient and which results in thorough mixing of the fiber with the food.

It is another object of this invention to provide a method of incorporating edible fiber into food which improves the ability of the fiber to more readily absorb water or oil.

These and other objects of the invention will become clear by the disclosure herein.

SUMMARY OF THE INVENTION

This invention is a process for rendering an edible fiber more easily hydratable for addition to food products. Edible fiber is co-milled in a multi-impact mill with sugar and optionally flour and starch. This co-milling improves the dispersion and the water absorbing rate of the fiber when it is added to food. As a result, better and moister food products are produced. The invention also comprises the fiber product made according to this process.

DETAILED DESCRIPTION OF THE INVENTION

This invention relates to a method for making edible fiber more dispersible and hydratable for addition to various food products. Specifically, it relates to a process whereby edible fiber is co-milled in a multi-impact mill with sugar, or with sugar and flour and/or starch, to produce a fiber product. This product can then be added to foods such as dry mixes as a means of improving textural aspects of the finished foods. Addition of the product to foods also is a ready means of incorporating more fiber into the diet.

It has now surprisingly been found that edible fiber can be more readily incorporated into food by first co-milling it in a multi-impact mill with sugar, or with sugar and flour and/or starch. This co-milling causes the fiber material to become more readily hydratable and more easily dispersible in the food to which it will be added.

This invention, then, is a process for rendering an edible fiber more easily hydratable for addition to food products comprising co-milling the fiber in a multi-impact mill with sugar, or with sugar and a material selected from the group consisting of flour and starch and mixtures thereof.

Co-milling is done in a multi-impact mill as described in U.S. Pat. No. 3,694,230, issued to Cooke, Sept. 26, 1972. The term "multi-impact mill", as used herein, defines multi-pass and multi-stage mills wherein size reduction and co-action of fiber, sugar, flour, and starch particles are accomplished by impact of the particles with hard surfaces and/or with each other without undue damage to the starch particles or the starch portion of the flour and without the use of metal to metal contact or liquid suspensions.

Multi-pass impact mills employ an internal particle size classifier to return oversize material for further grinding, or subject the material to be treated to repeated grinding actions in several internal stages. These multi-impact mills involve multiple impacts for any given particle and also involve a substantial co-action between particles of the material being treated. Air or a similar gas is used to suspend and transport the particles being treated within the mill.

In one specific type of useful multi-impact mill, the multiple-impact effect is achieved by utilizing an impact zone wherein particles are subjected to high speed impact with hard surfaces, and a classifying zone. Fine or properly-sized particles are discharged from the classifying zone and coarse or oversized particles are recycled to the impact zone in such a manner that co-action between particles is achieved. This type of mill can therefore be termed a multi-pass impact mill. Examples of useful multi-pass impact mills are described in the following references: U.S. Pat. 3,184,172 and U.S. Pat. 3,082,962. The multi-pass impact mill disclosed in the above-cited references involve high speed impact of particles with hard surfaces in an impact zone and internal classification whereby oversize particles are returned to the impact zone in such a manner that co-action between particles is achieved. Thus, co-milling in a multi-pass mill comprises size reducing particles in an impact zone and recycling oversized particles to the impact zone whereby the particles impact with each other.

A specific preferred multi-pass impact mill is known as a vertical air-swept impact mill. In this mill, particles are fed to the bottom of a cylindrical-shaped housing containing a vertical rotating shaft. Vanes on the shaft create a whirling vertical air flow and revolving impactors on the shaft crush the particles against the housing walls as the air flow causes the particles to pass upward through the impact zone. Above the impact zone, an exhaust fan pulls fines upward through revolving centrifugal selector arms while deflector walls cause large particles to return downward to the impact zone where they co-act with the upward flowing input particles.

In another type of useful multi-pass impact mill, the impact of one particle against another is utilized to accomplish essentially all of the required size reduction and co-action. The mill per se serves mainly to contain, direct and control high velocity air streams which transport the particles. Such mills are sometimes referred to as "jet mills".

In a second specific type of multi-impact mill, the multiple impact effect is achieved by utilizing an impact zone comprised of successive stages. For example, the particles can be passed on a tortuous path through rows of intermeshing (but not touching) studs or pins provided on a stationary and a rotatable disc or the particles can be passed through a series of propeller-type projections attached to a single shaft rotating at high speed. This type of impact mill can thus be termed a multi-stage impact mill and is preferable for use in this invention. Such mills inherently involve internal recycling and co-action of particles in the impact zone due to the difficulty experienced by the particles in passing from one stage to the next. Examples of useful multi-stage impact mills are disclosed in U.S. Pat. Nos. 2,752,097, 2,875,956, and 3,067,959. Thus, co-milling in a multi-stage impact mill comprises size-reducing particles in an impact zone of successive stages whereby the particles impact with each other.

An especially preferred multi-stage impact mill for use in the present invention is known as a sieveless impact stud mill or "pin mill" and is sold by Alpine Aktiengellschaft, Augsburg, Germany. This mill utilizes two coaxially-mounted discs having an array of studs in circumferential rows projecting therefrom and interspaced between the two discs. One disc is stationary while the other rotates at high speeds, e.g., 5,000-15,000 rpm's. The particles to be co-milled are released into the center of the discs and are forced to the periphery thereof by centrifugal force. Size reduction and co-action is achieved by the interaction of particles with each other and with the studs as the material passes on its tortuous path through the rows of interspaced studs provided on the stationary and the rotatable disc. Each row of studs represents a stage. A similar sieveless impact stud mill and also a preferred multi-stage impact mill for use herein is disclosed in U.S. Pat. 2,712,416, and also sold by Alpine Aktiengellschaft, Augsburg, Germany. In this particular mill, both of the discs revolve, preferably at different speeds or in different directions to each other.

Preferably, sieveless impact stud mills of the type described above have the following characteristics: Diameter of discs, 4 inches to 40 inches; diameter of studs, 0.1 inch to 0.4 inch; length of studs, 0.5 inch to 2.0 inches; number of studs per disc, 30 to 300; rows of studs per disc, 2 to 10; speed of rotating disc, 1,000 rpm to 18,000 rpm; speed of second rotating disc (if so equipped), 500 rpm to 10,000 rpm.

Although dependent on such variables as the size and type of multi-impact mill used, a desirable flow rate through the mill is within the range of from about 5 pounds to about 200 pounds, preferably from about 10 pounds to about 150 pounds, of material being processed per hour per horsepower of the mill. The power of the mill can in turn range from about 1 to about 125, preferably from about 10 to about 75 horsepower.

The total work input is also governed to some extent by the specific mill and conditions employed. However, a total work input to the mill within the range of from about 1 to about 50 watt hours per pound of material has been generally found to be desirable. Preferably, the total work input to the mill should be within the range of from about 2 to about 12 watt hours per pound.

In accordance with the disclosure set forth above, the term "multi-impact mill," as used herein, defines multi-pass and multi-stage mills wherein size reduction and co-action of the particles are accomplished by impact of the particles with hard surfaces and/or with each other without undue damage to the starch or the starch portion of the flour and without the use of metal to metal contact or liquid suspensions.

The crystalline sugar, flour and starch particles that are co-milled in this invention are conventional ingredients in normal form. The ordinary granulated sugars are suitable for use herein. These include sucrose, dextrose, maltose, fructose, lactose, brown and invert sugars, alone or in combination. The most common crystalline sugar is sucrose. Flour includes bleached and unbleached flours from grain products, e.g. wheat flour, corn flour, rye flour, etc. Protein flours, such as soy flour, and synthetic flours can also be used herein. The starch used can be any of the common food starches, such as potato starch, corn starch, wheat starch, rice starch, barley starch, oat starch, tapioca starch, arrowroot, and sago starch.

The "edible fiber" used herein can be any of the available edible fibrous materials. For example, whole citrus peel fiber or citrus albedo fiber can be used, processed in any of the ways known to the art. Citrus vesicle solids and citrus pulp are also suitable for use herein. Other fruit or vegetable fibers can be used. For example, sources of edible fiber include sugar beet pulp, apples, apricots, bran, sugar cane pulp, pineapple core, soybeans, watermelon rinds, corn, barley, oats, wheat, tomatoes, rice, and peanuts. The fruit and vegetable fibers are preferred, and most preferred are whole citrus peel fiber and citrus albedo.

Purified plant cellulose, or cellulose fiber, can also be used. Examples include alpha-cellulose and microcrystalline cellulose which are sold under the trade names "Solka-Floc" and "Avicel".

One of the characterizing effects of the co-milling is to cause combined fiber-sugar, fiber-sugar-flour, and fiber-sugar-starch particles to form along with size-reduced fiber, sugar and and/or starch flour particles per se. All of the particles are finely ground.

Improved dispersion and hydratability of the fiber product of this invention are best achieved when the co-milling process is conducted until the fiber, sugar, flour and/or starch particles (and the "combined" particles) are substantially reduced in size. Preferably, the co-milling is conducted until at least about 80% of the particles have a particle size less than about 300 microns. More preferably, the co-milling is conducted until at least about 80% of the particles have a particle size less than about 200 microns, and most preferably the co-milling is conducted until at least about 80% of the particles have a particle size less than about 100 microns. A prior size reduction step can be used before the co-milling if necessary to produce the very small particle sizes.

The process of this invention makes the edible fiber more easily incorporated into a food product by increasing the fiber's hydratability and dispersibility. While not intending to be bound by theory, these improvements in water holding capacity and dispersion are thought to be caused by the following mechanisms. The sugar particles are abrasive, and produce a shearing action on the fiber. The sugar particles actually penetrate the fiber particles during co-milling, breaking open the fiber particles. This increases the surface area of the fiber, and increases the penetration of water into the fiber, resulting in an easier and more thorough hydration of the fiber. In addition, the shearing action of the sugar also physically separates some of the fiber particles and agglomerates into smaller particles. The smaller particles are more dispersible in the food. The net result is that fiber is better disposed throughout the food and is capable of absorbing water faster. It is also capable of more readily absorbing oil.

In addition, a more intimate mixing of the fiber in the food is achieved. If edible fiber, sugar, and flour are simply added as is to a baked good product, for example, fairly large clumps of particles will result. After the co-milling of this invention, on the other hand, individual discrete particles of the fiber, sugar and flour are obtained. This produces a better baked good. Of course, the hydratability and dispersibility of the particles is also enhanced by the particle size reduction resulting from the co-milling. Smaller particles have a higher surface area to volume ratio, so they are more easily hydratable. The smaller size also makes it easier for them to fully disperse throughout the food.

The fiber product of this invention is contemplated for use in foods such as dry mixes or in ground meat products as a meat extender. Dry mixes include baked good mixes such as those for cakes, brownies and muffins. These examples are merely illustrative, however; the fiber product can be used wherever it is appropriate and desirable to incorporate fiber into a food. Addition of the fiber product to the food can be done by the food manufacturer before the food reaches the consumer. Alternatively, the fiber product could be purchased separately by the consumer and added to foods such as dry mixes or recipes during food preparation.

The advantages of the use of the fiber product of this invention in baked goods are related to calorie reduction and moistness. For example, typical low-calorie cakes achieve their calorie reduction by reducing the amount of shortening and oil in the formulation. These cakes taste dry in texture because reducing the amount of oil and shortening reduces the moistness perception. Addition of extra water to these cakes to compensate for the reduced shortening and oil results in a cake having a gummy texture, because the cake batter is unable to hold all the extra water. When fiber, sugar and flour and/or starch, co-milled according to the instant invention, are used in such a reduced calorie cake, the high absorbant rate of the fiber allows extra water to be added to the cake batter. The resulting cake is moist and not gummy in texture.

The present fiber product is also suitable for use in brownies, to improve their texture, height and moisture retention. Typical brownies have a collapsed fudgy bottom layer and a drier upper half. While not intending to be bound by theory, this is thought to be caused by a water loss in the top half of the brownie, and the inability of bottom half moisture to travel through the dried-out upper part. Use of the co-milled fiber in a brownie provides a relatively uniform moist texture throughout the brownie, and the brownie is higher because of the elimination of a collapsed fudgy bottom half.

Another use for the present fiber product is as a meat extender. A meat extender prepared from co-milled fiber, sugar, and flour or starch helps the meat to retain more moisture during cooking. For example, hamburgers prepared with ground beef and co-milled citrus albedo fiber, sugar and flour taste very moist and tender because more of the oils and juices of the ground beef are retained during cooking. An additional benefit is that meat prepared with the dry mix of this invention can be frozen and then reheated without losing much end taste or texture. When the instant fiber product is used as a meat extender, the amount of sugar used is low enough to be unobjectionable in taste.

The amounts of fiber, sugar, flour, and starch in the fiber product of this invention can be varied depending on the type of food to which it will be added, to achieve its particular benefits in that food. In addition, the product can comprise just fiber and sugar, or fiber and sugar and flour and/or starch, depending on its prospective use.

EXAMPLE 1

A reduced calorie yellow cake is made combining the following ingredients:

| Ingredient | Amount (gms) |
| --- | --- |
| Flour | 222 g |
| Sugar | 210 g |
| Egg | 96 g |
| Water | 400 g |
| Shortening | 20 g |
| Emulsifiier | 3 g |
| Minors (flavors, colors, etc.) | 21 g |
| Citrus Albedo Fiber (less than 3 mm size) | 10 g |

The flour, sugar, and citrus albedo fiber are briefly mixed and then co-milled together according to the process of this invention. The co-milling is done in a Type 160Z sieveless impact stud mill or "pin mill", manufactured by Alpine Aktiengellschaft, Augsburg, Germany. The mill has one stationary disc and one rotating disc which is set at 7,500 rpm's. The discs are 6 1/2" in diameter, the diameter of each stud is 1/8', the length of each stud is 13/32', there are 196 studs per disc, and there are four rows of studs per disc. The intermixed fiber, sugar, and flour particles are released into the center of the discs and are forced to the periphery thereof by centrifugal force.

The co-milled fiber, flour and sugar are blended with the other ingredients and mixed together in a standard kitchen mixer at 550 rpm speed for 2 minutes to form a batter. The batter is poured into an 8" diameter round pan and baked at 350° F. for 37 minutes. The cake is removed from the oven and allowed to cool.

The cake is reduced in calories because of a reduced amount of shortening and no extra oil added. Nevertheless, the cake still tastes desirably moist due to the additional water held by the co-milled citrus albedo fiber. The texture is uniform and tender, and not gummy or runny.

EXAMPLE 2

Three hamburger patties are prepared. The first hamburger contains 125 grams of ground beef. The second hamburger contains 125 g ground beef and 6.5 g (6%) sugar/flour, while the third hamburger contains 125 g ground beef and 11.25 g (9%) fiber/sugar/flour.

The "fiber/sugar/flour" is a 1:1:1 mix of co-milled fiber, sugar and flour, and the "sugar/flour" is a 1:1 mix of co-milled sugar and flour. Co-milling has been done using a pin mill as described in Example 1. The fiber is citrus albedo fiber having a particle size less than 3 mm. The fiber/sugar/flour and sugar/flour is mixed with the ground beef at low speed for about a minute using a standard mixer.

The hamburger patties are fried in a skillet at about 320° F. (160° C.) for about 3½ minutes, then turned over and fried for 3½ more minutes. The hamburgers are weighed for fat loss and water loss. The following results are obtained:

| Hamburger | Fat Loss | Water Loss |
| --- | --- | --- |
| 100% Ground Beef | 17 g | 22.7 g |
| 94% Ground Beef, | | |

| Hamburger | Fat Loss | Water Loss |
|---|---|---|
| 6% Sugar/Flour 91% Ground Beef, | 16.9 g | 16.3 g |
| 9% Fiber/Sugar/Flour | 10.8 g | 12.4 g |

The results demonstrate that hamburger made with 9% fiber/sugar/flour loses less fat and water than the hamburger made with 6% sugar/flour, which loses less than the 100% ground beef hamburger. The co-milled fiber is very absorbent, and it effectively increases the amount of fat and oil held in the hamburger. The resulting hamburger tastes very moist and juicy.

What is claimed is:

1. A process for rendering an edible fiber more easily hydratable for addition to food products comprising co-milling the fiber in a multi-impact mill with sugar and a material selected from the group consisting of flour and starch and mixtures thereof, wherein the co-milling is done without the use of liquid suspensions, and wherein there is substantial co-action between particles during co-milling.

2. A process according to claim 1 wherein the co-milling is conducted until at least about 80% of the fiber particles have a particle size less than about 300 microns.

3. A process according to claim 2 wherein the co-milling is conducted until at least about 80% of the fiber particles have a particle size less than about 200 microns.

4. A process according to claim 2 wherein the co-milling is conducted until at least about 80% of the fiber particles have a particle size less than about 100 microns.

5. A process according to claim 4 wherein the fiber is selected from the group consisting of fruit fiber and vegetable fiber, and mixtures thereof.

6. A process according to claim 5 wherein the fiber is selected from the group consisting of whole citrus peel and citrus albedo, and mixtures thereof.

7. A process according to claim 6 wherein the fiber, sugar, and material are co-milled by passing them through a multi-impact mill which is a multi-stage sieveless impact stud mill, said mill having one stationary disc and one rotating disc, said rotating disc operating at high speeds of from about 5,000 to about 18,000 rpm.

8. A process for rendering an edible fiber more easily hydratable for addition to food products comprising co-milling the fiber in a multi-impact mill with sugar, wherein the co-milling is done without the use of liquid suspensions, and wherein there is substantial co-action between particles during co-milling.

9. A process according to claim 8 wherein the co-milling is conducted until at least about 80% of the fiber particles have a particle size less than about 300 microns.

10. A process according to claim 9 wherein the co-milling is conducted until at least about 80% of the fiber particles have a particle size less than about 200 microns.

11. A process according to claim 9 wherein the co-milling is conducted until at least about 80% of the fiber particles have a particle size less than about 100 microns.

12. A process according to claim 11 wherein the fiber is selected from the group consisting of fruit fiber and vegetable fiber, and mixtures thereof.

13. A process according to claim 12 wherein the fiber is selected from the group consisting of whole citrus peel and citrus albedo, and mixtures thereof.

14. A process according to claim 13 wherein the fiber and sugar are co-milled by passing them through a multi-impact mill which is a multi-stage sieveless impact stud mill, said mill having one stationary disc and one rotating disc, said rotating disc operating at high speeds of from about 5,000 to about 18,000 rpm.

15. The product of the process of claim 1, wherein the product comprises combined fiber-sugar particles and combined particles selected from the group consisting of fiber-sugar-flour and fiber-sugar-starch particles, and mixtures thereof, along with size-reduced fiber and sugar particles and size-reduced particles selected from the group consisting of flour and starch particles, and mixtures thereof.

16. The product of the process of claim 7, wherein the product comprises combined fiber-sugar particles and combined particles selected from the group consisting of fiber-sugar-flour and fiber-sugar-starch particles, and mixtures thereof, along with size-reduced fiber and sugar particles and size-reduced particles selected from the group consisting of flour and starch particles, and mixtures thereof.

17. The product of the process of claim 8, wherein the product comprises combined fiber-sugar particles along with size-reduced fiber and sugar particles.

18. The product of the process of claim 14, wherein the product comprises combined fiber-sugar particles along with size-reduced fiber and sugar particles.

* * * * *